United States Patent [19]
Raymer et al.

[11] Patent Number: 5,221,236
[45] Date of Patent: Jun. 22, 1993

[54] BELT TENSIONING DEVICE FOR BELT DRIVEN BICYCLE

[76] Inventors: Matthew C. Raymer, 6102 East Mockingbird, Ste. 248, Dallas, Tex. 75214; David T. Mollendor, U.S. Naval Joint Services Activity. The New Sanno APO, San Francisco, Calif. 96503-0110

[21] Appl. No.: 880,283

[22] Filed: May 4, 1992

Related U.S. Application Data

[63] Continuation of Ser. No. 550,752, Jul. 10, 1990, abandoned.

[51] Int. Cl.⁵ .............................................. F16H 7/08
[52] U.S. Cl. ................................... 474/109; 474/134; 474/150; 474/164; 474/165
[58] Field of Search ................. 474/109, 133–135, 474/140, 150, 160, 164, 165, 205

[56] References Cited

U.S. PATENT DOCUMENTS

| | | | |
|---|---|---|---|
| 315,735 | 4/1885 | Colburn | 474/134 |
| 611,170 | 9/1898 | Howard | 474/134 |
| 952,156 | 3/1910 | Trewhella | 474/134 |
| 976,115 | 11/1910 | Bard | 474/134 |
| 1,016,787 | 2/1912 | Sawall | 474/109 |
| 1,433,958 | 10/1922 | Laughton | 474/134 X |
| 1,733,968 | 10/1929 | Klieber | 474/134 X |
| 2,425,476 | 8/1947 | Lade et al. | 474/134 X |
| 2,588,880 | 3/1952 | Richards | 474/134 X |
| 2,900,831 | 11/1956 | Wilson et al. | 474/134 X |
| 2,945,393 | 7/1960 | Paulson | 474/134 X |
| 3,186,003 | 5/1965 | Gregory, Jr. et al. | 474/134 X |
| 3,332,293 | 7/1967 | Austin et al. | 474/134 |
| 3,817,114 | 6/1974 | Klee | 474/134 X |
| 4,034,821 | 7/1977 | Stoddard et al. | 474/134 X |
| 4,069,719 | 1/1978 | Cancilla | 474/134 X |
| 4,191,062 | 3/1980 | Gardner | 474/134 X |
| 4,416,647 | 11/1983 | White, Jr. | 474/134 |
| 4,479,660 | 10/1984 | Pattison | 474/134 X |
| 4,564,098 | 1/1986 | Hormann | 474/134 X |
| 4,768,998 | 9/1988 | Hirose et al. | 474/152 |

FOREIGN PATENT DOCUMENTS

| | | | |
|---|---|---|---|
| 1500384 | 6/1969 | Fed. Rep. of Germany | 474/134 |
| 178042 | 10/1983 | Japan | 474/134 |

Primary Examiner—Ramon S. Britts
Assistant Examiner—Roger J. Schoeppel
Attorney, Agent, or Firm—David H. Judson

[57] ABSTRACT

A belt tensioning device for a belt driven bicycle that includes a tension plate having triangular positioned orifices. The plate is pivotally mounted to the frame with one of the orifices. Rollers are mounted in the other two orifices and the drive belt passes between the roller. When the belt tightens against one of the rollers, it pivots the tension plate, forcing the other roller into the belt and preventing any slack from occurring.

3 Claims, 3 Drawing Sheets

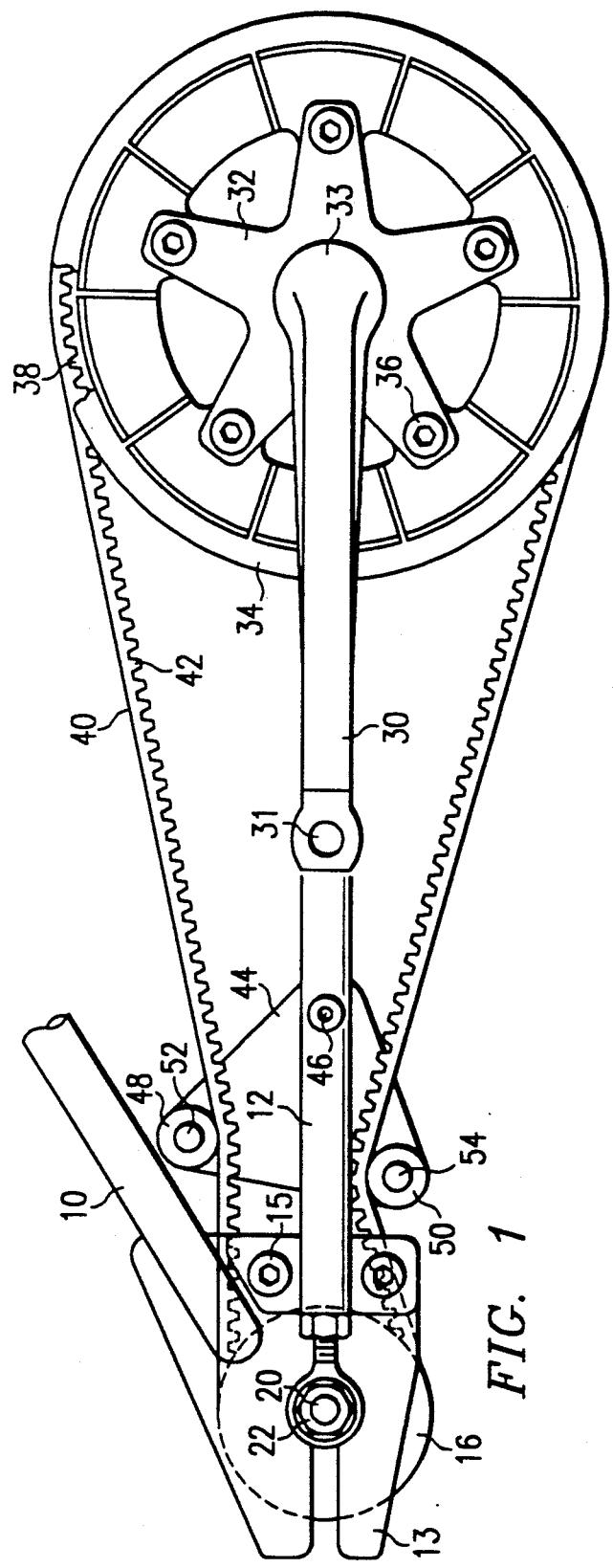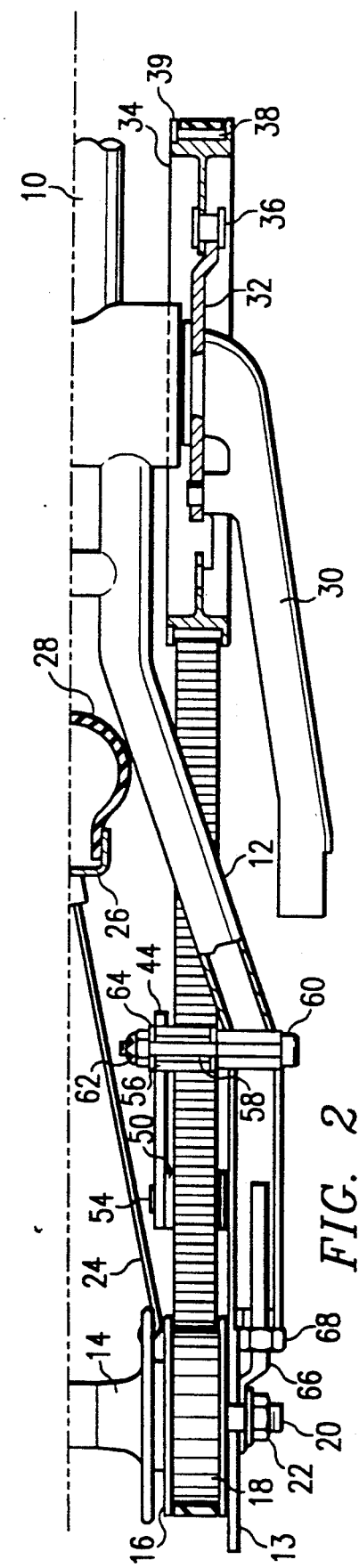

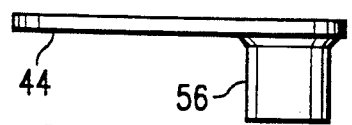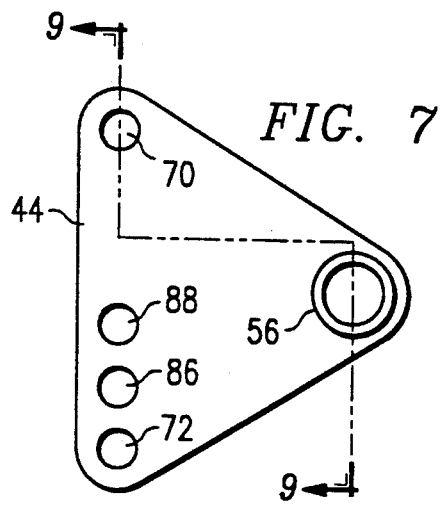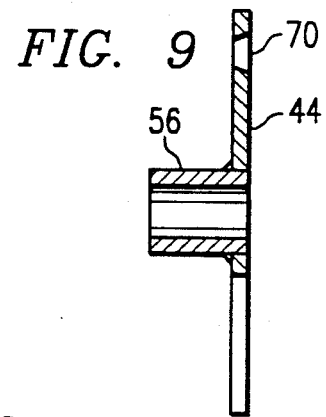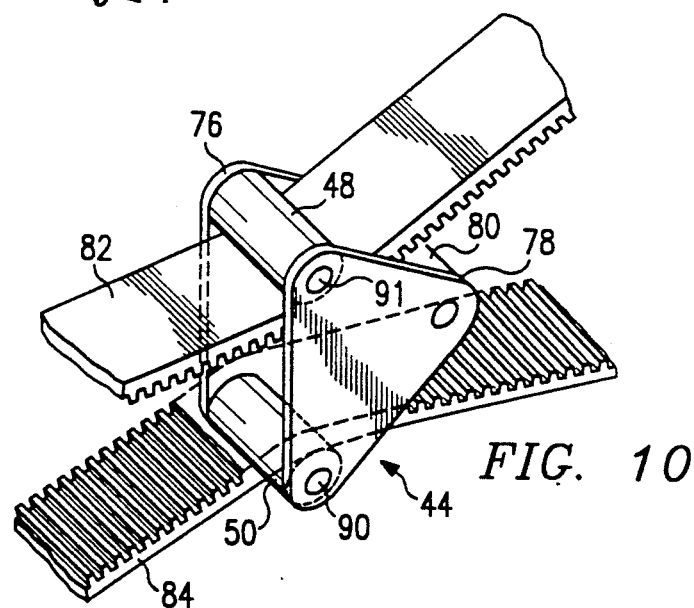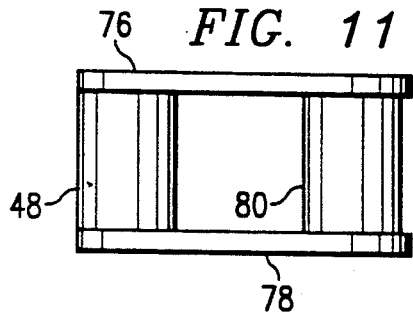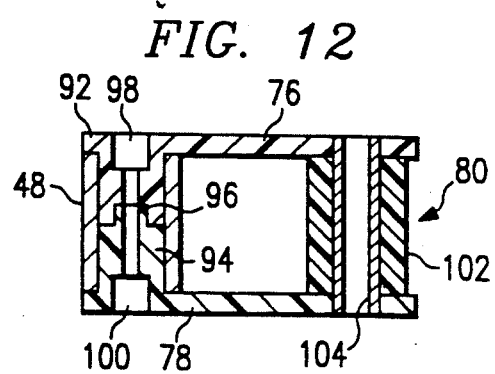

BELT TENSIONING DEVICE FOR BELT DRIVEN BICYCLE

This is a continuation of co-pending application Ser. No. 07/550,752 filed on Jul. 10, 1990 now abandoned.

FIELD OF THE INVENTION

The present invention relates in general to a belt driving apparatus for a bicycle and in particular to a belt driving apparatus which has an automatic tensioning device coupled between the frame and the driving belt to maintain balanced forces on the belt and prevent any slack from occurring.

BACKGROUND OF THE INVENTION

The sport of bicycle motocross (or BMX) involves the use of special bikes to imitate motorcycle motocross riders. BMX is a large industry that has bikes in the low end price range that are purchased in department stores and rarely see dirt riding, bikes that are purchased in the mid-price range at bicycle shops for street, dirt and racing action, and bikes at the high priced end that are purchased at bicycle shops and used strictly for BMX racing.

Chain drive systems for bicycles have several deficiencies. When at rest, there is slack in the chain as well as slack between the individual chain links. When the rider begins to pedal, there is a lag time before the rear wheel begins moving since the slack in the chain plus the slack between the individual links has to be taken up. All of this slack moves to the bottom section of the chain. This means that the the bottom section of the chain is simply being carried along by the drive system without contributing driving force to the system.

The use of belt driven systems as drive units has proven to be much more efficient than chain drives in industrial applications. Belts are lighter than conventional chains and they require no oil or grease and are maintenance free. Further, there is no noise that is associated with chain drives and the belt is essentially silent. Belt drives also require torque regulators that constantly balance the slack in the belt. When this is accomplished properly, there is instant engagement/movement of the driven wheel by the driving wheel. With bicycles, this means there is instant engagement with the rear wheel when the rider begins pedaling. There is also added power to the rear wheel on the bottom section of the belt since it is in full driving contact with the teeth of the rear drive wheel pulley. This is known as "tooth wrap". Additionally, the belt has less friction, more surface area over which to transmit torque and less need for force to overcome the wrapping of the belt around the pulleys versus the wrapping of the chain.

Prior art tension regulators include idler wheels such as those disclosed in U.S. Pat. No. 4,768,998 that are close to each other to urge the toothed belt in a direction so as to apply a certain tensile force thereto in order to prevent the toothed belt from being removed or slipping. However, these idler wheels are rigidly mounted on the frame and do not pivot and when the toothed belt has force applied thereto by the idlers during tightening of the belt, continued movement of the belt with unequal force applied to it in its curved condition causes the belt to become damaged and requires the belt to be replaced.

Other devices such as disclosed in U.S. Pat. No. 976,115 utilize idler wheels that are coupled to each other by spring tension, thereby providing tension to the belt. However, the tension is uneven because the spring that connects the idler rollers and cause the adjustment to the belt does not always provide balanced forces to both sides of the belt when tension is applied to the belt.

Still another device disclosed in U.S. Pat. No. 4,034,821 utilizes a chain driven sprocket being pivoted on a swing arm about an axis intermediate the driven sprocket and the driving sprocket and coupled to a suspension system. Idler members on opposite sides of the pivot axis engage and pinch the chain flights together at points equidistant from the pivot axis. Thus, pivotal movement of the driven sprocket about the axis is resisted and there is a tendency for the swing arm to seek an equalized condition. This system is designed for chains and is rather complex and causes a pivotal movement of the driven sprocket about the axis to be resisted by tightening the chain since leverage is applied to the idler members and all moments operating about the pivot axis are applied in a direction opposite to the pivotal movement of the driven sprocket.

U.S. Pat. No. 4,191,062 discloses an automatic drive chain tensioner having a pair of idler assemblies with each idler assembly comprising an idler sprocket and an indexing sprocket on each side of and concentrically connected to the idler sprocket with each idler assembly being adapted to be positioned on the outside of a drive chain loop on a chain run between a driving and a driven sprocket. A pair of indexing chain loops each of which engages an indexing sprocket on each of the spaced-a-part idler assemblies is also required. Again, this system is extremely complex, is designed for chain drives and is expensive to manufacture and maintain.

The present invention overcomes the disadvantages of the prior art by providing a simple unitary tension plate having orifices in the general shape of a triangle with an orifice forming each of the apices of the triangle. One of the orifices is used as a pivot point to couple to a frame member connecting the driving pulley and the driven pulley. A roller is mounted in each of the other orifices as an idler wheel and the belt coupling the driving pulley to the driven pulley passes between the idler wheels to maintain a predetermined tension on the belt. When the upper section of the belt is placed under tension such as when causing movement of the rear wheels, it places a pressure on the upward idler wheel tending to pivot the tensioner plate about its pivot point. This causes the other idler wheel to place pressure against the lower section of the belt.

Thus, because of the close center-to-center distance of the idler wheels, which distance is fixed by the unitary tension plate, preferably triangular shaped, the tight side of the drive belt, when attempting to form a straight line under tension, applies pressure to the idler wheel resting against it and rotates the tension plate. This rotation of the tension plate, in turn, causes the slack side of the belt to be tightened by the other idler wheel pressing against it. Thus, the tension plate automatically attempts to move into a position which seeks a balance of forces on both the upper and lower section of the belt. Thus, the device is very simple, very economical, and very effective in maintaining balanced forces on both sides of the belt around the driven pulley.

It is therefore an object of the present invention to provide a belt tensioning system that is not only simple and economical to construct, but also that is effective in maintaining balanced forces on the driving belt around the driven pulley and maintaining sufficient "tooth wrap" around the driven pulley.

It is also an object of the present invention to provide an automatic tensioning system which includes a triangular shaped tension plate that is pivotally attached at one corner to the frame and which has idler wheels mounted in the other corners of the triangular tension plate and between which the belt moves in its continuous path such that any forces applied to one side of the belt or the other causes the tension plate to automatically move to adjust the pressure on both sides of the belt so that tensions on the belt remain constant and no slack is allowed to exist.

SUMMARY OF THE INVENTION

Thus, the present invention relates to a belt tensioning device for a bicycle having a frame connecting a driving pulley and a driven pulley comprising an endless toothed belt coupling the driving pulley and the driven pulley, a torsion plate having triangular positioned orifices, one of the orifices being pivotally attached to the frame between the pulleys, and a roller rotatably mounted in each of the other orifices of the torsion plate, each of the rollers rotatably contacting the outer surface of the continuous belt such that the belt passes between the rollers, the roller being spaced such that the pivotal mounting of the torsion plate enables a tightening of one side of the belt to cause one roller to rotate the torsion plate toward the one side so as to cause the other roller to be forced into the other side of the belt and balance the forces on the belt by taking up any slack.

BRIEF DESCRIPTION OF THE DRAWINGS

These and other advantages of the present invention will be more fully understood in conjunction with the accompanying drawings in which like numerals represent like elements and in which:

FIG. 1 is a partial side view of the driving pulley and the driven pulley illustrating the belt path and the automatic tensioning device mounted the the frame and contacting the drive belt;

FIG. 2 is a cross-sectional view of the partial side view show in FIG. 1 taken along lines 2—2;

FIG. 7 is a plan view of the tensioner plate;

FIG. 8 is a top view of the tensioner plate;

FIG. 9 is a cross-sectional view of FIG. 7 taken along lines 9—9;

FIG. 10 is an isometric view of an alternate embodiment of a tension plate;

FIG. 11 is a top view of the alternate embodiment shown in FIG. 10; and

FIG. 12 is a cross-sectional top view of the embodiment shown in FIG. 11.

DETAILED DESCRIPTION OF THE DRAWINGS

Figure 3A:
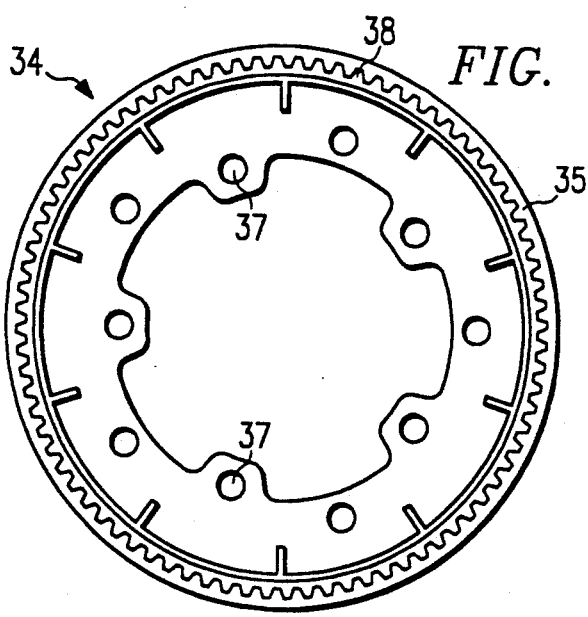
FIG. 3A is a side view of the driving pulley or crank pulley.
Figure 3B:
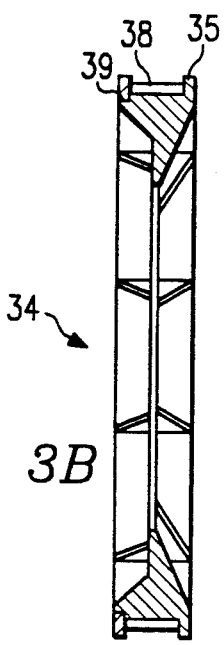
FIG. 3B is a cross-section view of the crank pulley illustrated in FIG. 3A taken along lines 3B—3B.

As stated earlier, belt drives are much more efficient than the chain drive. They are also lighter than conventional chains, require no oil or grease and are maintenance free and clean. There is relatively no noise and the belt provides a silent and smooth ride. However, it is necessary to provide a tensioning device or torque regulator that constantly balances the slack in the belt. When this happens, instant engagement/movement of the rear wheel is provided when the bike begins to move. Added power is provided to the rear wheel with the bottom section of the belt since there is no slack on the bottom section and there is instant engagement of the teeth "wrapped" in engagement with the drive pulley teeth. Further, the belt has greater engagement friction than a chain, more surface area in which to transmit torque and requires less force to overcome the wrapping of the belt around the pulleys versus the wrapping of the chain around the sprockets.

FIG. 1 is a partial side view of a bicycle illustrating the novel tensioning device of the present invention. As can be seen in FIG. 1, an arm portion 12 of the frame 10 (shown in FIG. 2) is coupled to a terminating plate 13 mounted to the rear axle of the bicycle. A free wheel pulley 16 is mounted on axle hub 14, shown in FIG. 2, and held in place by bolt 20 and nut 22. The hub 14 has a plurality of spokes 24 coupled to the wheel rim 26 on which a tire 28 is mounted.

A pedal crank arm 30 is mounted to frame 10 in a well-known manner and drives a power disk 32. Power disk 32 is coupled to crank pulley 34 with nuts and bolts 36. The crank pulley 34 has teeth 38 for engaging the teeth 42 on the inside of a drive belt 40. Drive belt 40 may be of any well-known type such as rubber containing Kevlar fibers. A pulley flange 39 is mounted by any well-known means, such as screws, on the other side of the crank pulley 34 to form a U-shaped channel for receiving the drive belt 40.

The tensioner plate 44 is preferably triangular in shape and is pivotally mounted through an orifice in one apex of the triangle to the arm portion 12 of frame 10 by means of a screw 60. The preferred distance from the center of screw 60 to the center of bolt 20 at the rear wheel is 131 mm or approximately 5.1575 inches. An axle tube 56 projects from the plate 44 with a bronze bushing 58 on the inside thereof. The screw 60 fits on the inside of the bronze bushing and is secured with a locknut 62 and a bronze thrust washer 64. Thus the tensioner plate 44 rotates about screw 60 at pivot point 46. At the other corners of the triangular shaped tensioner plate 44 are idler wheels or rollers 48 and 50 mounted on bolts 52 and 54 respectfully. The rollers are bronze bushings riding on the flathead screws 52 and 54. The tensioner plate 44 is attached to the frame arm portion 12 such that the orifices with rollers 48 and 50 are located between pivot point 46 and the driven pulley 16. It will be seen in FIG. 1 that the driving pulley axis 33, the driven pulley axis 20 and the tensioner plate pivot point 46 are all in a common horizontal plane. This is the ideal configuration although, if desired, the tension plate pivot point could be located slightly above or slightly below the common horizontal plane.

The arm portion 12 of frame 10 has a bolt 66 attached at the rear end thereof that has an orifice in the outer end that is received by bolt 20 that holds the rear wheel hub in place. By tightening or loosening nut 68, the position of the rear wheel can be adjusted and thus place a predetermined initial tension on belt 40.

It will be noted in FIG. 1 that the path of travel of belt 40 passes on the inside of each of the rollers 48 and 50. Because of the fixed position of the rollers 48 and 50 with respect to each other and the adjustment of the rear wheel with respect to the frame, a predetermined tension is applied to the belt 40 to remove any slack from the belt.

The details of the construction of the tensioner plate 44 is illustrated in FIGS. 7, 8 and 9. As can be seen in FIG. 7, the plate 44 is essentially, and preferably, triangular in shape with the pivot point 46 being formed with an axle tube 56 in one corner of the triangle. Orifices 70 and 72 are formed in the other corners of the triangle through which bolts 52 and 54 can be inserted to mount the rollers 48 and 50 respectfully. FIG. 8 illustrates the extension of axle tube 56 from the surface of the tensioner plate 44. FIG. 9 is a cross-sectional view of the device in FIG. 7 taken along lines 9—9. Clearly the tensioner plate 44 does not, itself, have to be triangular in shape. However, it needs to be of a shape so that the orifices are substantially positioned in a triangular relationship with equal distance from the pivot point 46 to the orifices 70 and 72. In the preferred embodiment, the orifices 70 and 72 are separated by a distance in the range of 2.5 to 2.75 inches and preferably by 2.687 inches. The pivot point 46 is positioned on a line perpendicular to and bisecting the center line connecting orifices 70 and 72. It is also positioned at an angle of 31.7° from the horizontal with respect to either of the orifices 70 and 72. The horizontal distance from the center of the line connecting the orifices 70 and 72 to the pivot point 46 or the center of axle tube 56 is in the range of 1.8 to 2.1 inches and is preferably 1.937 inches. Plate 44 may be 0.125 inches thick. The preferred distances provide optimum operation of the pulleys and gives the preferred "tooth wrap".

FIG. 3A is a side view of the crank pulley 34 illustrating the teeth 38 for receiving the teeth 42 of drive belt 40 and a flange 35 which is formed on one side of the pulley to contain the belt 40. A recess ledge 39 receives a retainer ring (not shown) that forms an additional flange for creating a U-shaped channel with flange 35 to contain belt 40 therein on either side of teeth 38. The retainer ring may be attached in any well-known manner such as by screws. The power drive plate 32 is coupled with bolts 36 to the crank pulley 34 through orifices 37.

Figure 4:
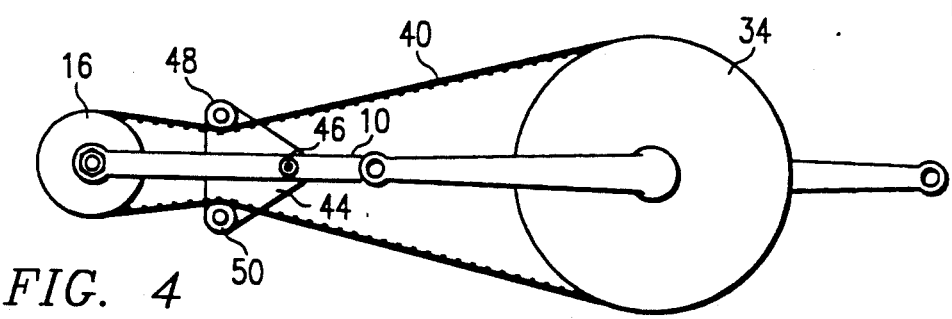
FIG. 4 is a schematic representation of the driving pulley and the driven pulley with the tensioning device in the neutral position and applying equal pressure to both sides of the belts.
Figure 5:
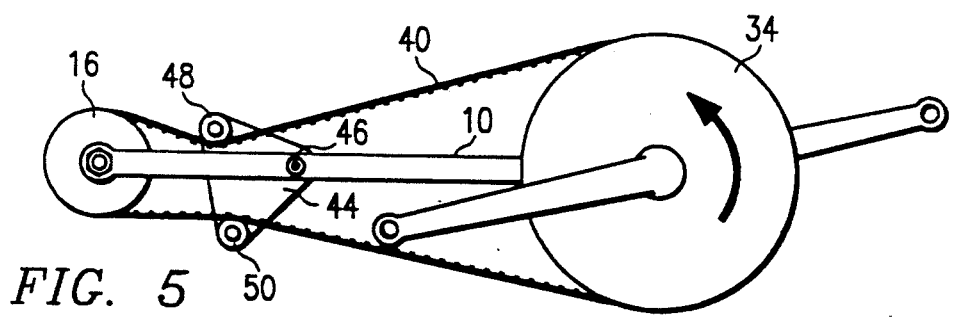
FIG. 5 is a schematic representation of the driving pulley, the driven pulley, the drive belt and the tensioning device illustrating a pressure being applied to the lower side of the belt and causing the tensioning device to apply corresponding pressure to the opposite or upper side of the belt.
Figure 6:
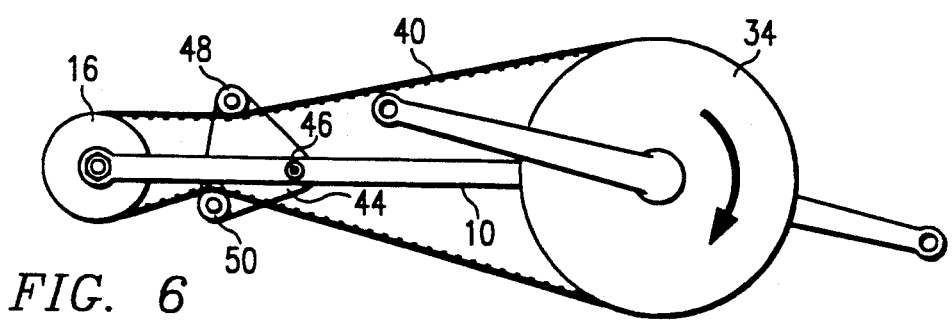
FIG. 6 is a schematic representation of the driving pulley, the driven pulley, the drive belt and the tensioning device illustrating a pressure being applied by the upper portion of the belt and causing the tensioning to apply corresponding equal pressure on the opposite or lower side of the belt.

FIGS. 4, 5 and 6 illustrate the simplicity of the operation of the belt tensioning device. Note in FIG. 4 that the rollers or idler wheels 48 and 50 are equidistant from the center line of frame 10 connecting the crank pulley 34 with the free wheel pulley 16. In that case, equal tension is applied to both side of belt 40. Thus there is no slack in belt 40 and the belt is held in engagement with the sprocket of the driven wheel 16 at least halfway around the circumference of the sprocket thus creating a positive drive pressure on the top and the bottom of the sprocket of the wheel 16 at all times. Note in FIG. 6 that when pressure is applied by crank pulley 34 to the upper portion of belt 40 tending to cause the top portion of belt 40 to assume a straight line that the pressure against roller 48 tends to pivot tensioner plate 44 about pivot point 46 in the upward or clockwise direction in FIG. 6. Because rollers 48 and 50 are held in fixed relationship to each other, the lower pulley is also moved upwardly against the lower portion of belt 40 maintaining the same tension and keeping the belt in constant contact with the driven pulley 16 at all times. Note that the tensioner plate 44 automatically seeks a balanced position depending upon the pressure applied to belt 40. In like manner, in FIG. 5, if the reverse pressure is applied to belt 40 through crank pulley 34, and the bottom portion of belt 40 has pressure applied thereto and tends to straighten it out, the tensioner plate 44 pivots counter-clockwise about pivot point 46, causing roller 48 to bring pressure against the top portion of belt 40 again seeking a balanced position automatically and keeping the belt 40 in constant contact with driven wheel 16 at all times.

If the tensioner plate 44 had the shape shown in FIG. 7 of U.S. Pat. No. 4,768,998, incorporated herein by reference in its entirety, the distances to the orifices 70 and 71 could be adjusted to provide different torques on one side of the belt compared to the other. For example, if the distance from axle hub 56 on FIG. 7 to orifice 70 were one inch and the distance from axle hub 56 to orifice 72 were two inches, a force of 20 lb. applied at orifice 70 would give 10-inch pounds at orifice 72. Thus, pressure can be varied very different arm lengths on the tensioner plate 44.

While the tension plate 44 is preferably made of steel, alternatively it could be made of hardened plastic. Such an alternate embodiment is shown in FIGS. 10, 11 and 12. The plate 44 is formed of spaced parallel side plates 76 and 78 with belt rollers 48 and 50 and spacer 80 at the pivot point 46. Belt sections 82 and 84 are illustrated at as passing between roller 48 and 50 and between side plates 76 and 78. It will be noted in FIG. 7 that additional spaced orifices 86 and 88 are formed above and spaced apart from orifice 72 where roller 50 is mounted. The additional orifices enable the roller 50 to be moved upwardly to increase tooth wrap of the belt about the rear pulley if desired.

FIG. 11 is a top view of the alternate embodiment of the tension plate shown in FIG. 10. Roller 48 and spacer 80 are shown between side plates 76 and 78.

FIG. 12 is a cross-sectional view of the plate 44 shown in FIG. 11 and as taken through roller 48 and spacer 80. Side plate 76 has a projection 92 extending inwardly toward side plate 78. In like manner, side plate 78 has a projection 94 extending inwardly toward projection 92. Projection 94 has a male portion 96 that mates with a corresponding female portion on projection 92. The mated projections form a bushing on which roller 48 is rotatably mounted. The side plates 76 and 78 can be held together with a bolt inserted through orifice 98 and a corresponding nut placed in orifice 100 to tighten the side plates as necessary and still allow the rollers 48 and 50 to rotate. If the projection 92 with the female portion is formed as part of lower orifice 90 (FIG. 10) and projection 94 with the male portion 96 is formed as part of upper orifice 91 (FIG. 10), the same plate can be used for both sides 76 and 78 simply by turning one of the plates over and placing a male projection 96 in mating contact with a corresponding female portion. The rollers 48 and 50 may have a concave surface, a convex surface or a flat surface as shown.

Concave and convex surfaces tend to hold the bolt centered.

Thus the present invention provides a torque regulator or tensioner plate that constantly, balances the slack in the belt. The result is instant engagement/movement of the rear wheel when pressure is applied to the crank pulley by the person riding the bike. Added power is provided to the rear wheel because the bottom surface of the belt remains in contact with the driven pulley as illustrated in FIG. 6. Thus by the simple pivoting motion of tensioner plate, it always seeks an equilibrium position and the belt always has equal tension applied on both sides thereby providing constant power to the driven sprocket without allowing any slack to occur in the belt even though changes in tension on one side or the other of the belt occur.

While the invention has been shown and described with respect to a particular embodiment thereof, this is for purpose of illustration rather than limitation; other variations and modifications of the specific embodiment herein shown and described will be apparent to those skilled in the art all within the intended spirit and scope of the invention. Accordingly the patent is not to be limited in scope and effect to the specific embodiment shown and described nor in any other way that is inconsistent with the extent to which the progress in the art has been advanced by the invention.

We claim:

1. A bicycle frame drive power system comprising:
a driving pulley and a spaced driven pulley each for rotating about an axis;
a frame portion rigidly connecting the rotatable axes of the spaced pulleys;
a continuous toothed drive belt connecting the spaced pulleys for enabling the driving pulley to rotate the driven pulley;
an automatic belt tensioning apparatus coupled to the frame and the belt for providing continuous proper tension on the drive belt;
the belt tensioning apparatus comprising a body member having a base portion and a hollow tube extending from the base portion, the base portion including a pivot orifice aligned with the hollow tube and a set of positioning orifices, wherein the pivot orifice and the positioning orifices together form a triangle;
a bushing supported in the hollow tube;
an axle received in the bushing and having an end attached to the rigid frame portion such that the body member is rotatable relative to the axle; and
a tension wheel rotatably mounted in each of the positioning orifices, the belt passing between the tension wheels such that each wheel rides on the outside of said belt to enable a pressure exerted by the belt on one of the tension wheels to be transmitted by the tensioning apparatus to the other side of the belt to constantly balance the slack in the belt.

2. A drive system for a bicycle, comprising:
a frame having a forward portion, a rear portion and an angled intermediate portion interconnecting the forward and rear portions such that the forward and rear portions of the frame are laterally offset form one another;
a driving pulley rotatably mounted on a hub secured to an end of the forward portion of the frame, wherein the driving pulley is supported in a plane passing through the intermediate portion of the frame;
a driven pulley rotatably mounted on a hub secured to an end of the rear portion of the frame, wherein the driven pulley is supported in the plane passing through the intermediate portion of the frame;
an endless toothed belt coupling the driving pulley and the driven pulley, the endless toothed belt formed of flexible material;
a tensioner plate having a base portion and a support extending from the base portion, the base portion including a pivot orifice aligned with the support and first and second positioning orifices, wherein the pivot orifice and the first and second positioning orifices together form a triangle;
means received in the support for pivotally attaching the tensioner plate to the frame at a position approximately where the intermediate and rear portions of the frame are joined; and
a roller rotatably mounted in each of the first and second positioning orifices of the tensioner plate and supported in the plane passing through the intermediate portion of the frame, each of the rollers rotatably contacting the outer surface of the endless belt such that the belt passes between the rollers, wherein the pivotal attachment of the tensioner plate to the frame enables any tightening of one side of the belt to rotate the tensioner plate so as to cause a roller to be forced into the other side of the belt and balance the forces on the belt by taking up any slack;
wherein the tensioner plate further includes provision for a third positioning orifice adjacent the second positioning orifice and aligned in a line extending through the first and second positioning orifices, wherein the roller mounted in the second positioning orifice is repositionable to the third positioning orifice to increase the degree of tooth wrap of the belt about the driven pulley.

3. A bicycle frame drive power system comprising:
a driving pulley and a spaced driven pulley each for rotating about an axis;
a frame portion rigidly connecting the rotatable axes of the spaced pulleys;
a continuous toothed drive belt connecting the spaced pulleys for enabling the driving pulley to rotate the driven pulley;
an automatic belt tensioning apparatus coupled to the frame and the belt for providing continuous proper tension on the drive belt;
the belt tensioning apparatus comprising first and second spaced side plates each including a pivot orifice and first and second positioning orifices, a hollow tube supported between the side plates and aligned with the pivot orifices of said side plates, and first and second rollers, the first roller supported between the side plates and aligned with the first positioning orifices and the second roller supported between the side plates and aligned with the second positioning orifices; and
means received in the hollow tube for pivotally attaching the belt tensioning apparatus to the rigid frame portion;
wherein the belt passes between the rollers such that each roller rides on the outside of the belt to enable a pressure exerted by the belt on one of the rollers to be transmitted by the tensioning apparatus to the other side of the belt to constantly balance the slack in the belt.

* * * * *